(12) United States Patent
Lee et al.

(10) Patent No.: US 12,351,490 B2
(45) Date of Patent: Jul. 8, 2025

(54) HIGH-CONCENTRATION WASTEWATER TREATMENT DEVICE FOR TREATING POLLUTANTS WITH STRONG OXIDIZING POWER USING PLASMA

(71) Applicant: GROON CO., LTD., Jeollabuk-do (KR)

(72) Inventors: In Ho Lee, Jeollabuk-do (KR); Young Pyo Hong, Jeollabuk-do (KR); Tae Hun Lee, Jeollabuk-do (KR)

(73) Assignee: GROON CO., LTD., Jeollabuk-Do (KR)

( * ) Notice: Subject to any disclaimer, the term of this patent is extended or adjusted under 35 U.S.C. 154(b) by 458 days.

(21) Appl. No.: 17/873,287

(22) Filed: Jul. 26, 2022

(65) Prior Publication Data
US 2024/0002264 A1    Jan. 4, 2024

(30) Foreign Application Priority Data
Jun. 29, 2022   (KR) .................. 10-2022-0079830

(51) Int. Cl.
*C02F 1/46*    (2023.01)
*C02F 1/72*    (2023.01)

(52) U.S. Cl.
CPC .............. *C02F 1/4608* (2013.01); *C02F 1/72* (2013.01); *C02F 2201/004* (2013.01); *C02F 2201/46175* (2013.01)

(58) Field of Classification Search
CPC ...... H01J 1/02; H01J 99/00; H01J 3/02; H01J 7/00; C02F 1/30; C02F 1/46; C02F 1/00
See application file for complete search history.

(56) References Cited

FOREIGN PATENT DOCUMENTS

| JP | 2007157541 A | * | 6/2007 |
| KR | 10-0529749 B1 | | 11/2005 |
| KR | 10-1042141 B1 | | 6/2011 |
| KR | 101295349 B1 | * | 8/2013 |

OTHER PUBLICATIONS

JP-2007157541-A Translation (Year: 2007).*
KR-101295349-B1 Translation (Year: 2013).*

* cited by examiner

*Primary Examiner* — Ekandra S. Miller-Cruz
(74) *Attorney, Agent, or Firm* — The PL Law Group, PLLC (57) ABSTRACT

A high-concentration wastewater treatment device includes a discharge pin module including a support plate, discharge pins coupled to the support plate, and pin connectors connected to the discharge pins and extended upwards, a discharge plate module spaced apart from the discharge pins, and a circuit module including a main board, distributed processing boards connected to the main board, coupling unit connecting the distributed processing boards, and discharge pin connection portions electrically connected to the distributed processing boards in a direction of a lower end of the main board. The discharge plate module includes a connection pin connected to a lower end of the support plate and a discharge plate accommodation portion coupled to a lower end of the bent portion. The discharge pin connection portions have, at lower ends, coupling grooves into which the pin connectors are inserted, to allow one-touch coupling between the circuit module and the discharge pin module.

5 Claims, 6 Drawing Sheets

HIGH-CONCENTRATION WASTEWATER TREATMENT DEVICE FOR TREATING POLLUTANTS WITH STRONG OXIDIZING POWER USING PLASMA

CROSS-REFERENCE TO RELATED APPLICATION AND CLAIM OF PRIORITY

This application claims the benefit under 35 USC § 119 of Korean Patent Application No. 10-2022-0079830, filed on Jun. 29, 2022, in the Korean Intellectual Property Office, the entire disclosure of which is incorporated herein by reference for all purposes.

BACKGROUND

1. Technical Field

The present disclosure relates to a high-concentration wastewater treatment device used for water treatment, pollutants treatment and deodorization, and more particularly, to a high-concentration wastewater treatment device with improved coupling structure between a circuit module and a discharge pin module that make up the high-concentration wastewater treatment device for one-touch attachment/detachment design, easy management of pollutants occurring during discharging and improved process efficiency through a simple power application structure.

2. Background Art

In general, a corona discharge process is known as a typical process or structure of producing negative ions in an atmospheric pressure condition. The corona discharge process induces a corona discharge between each electrode by applying high voltage to the electrodes for each corresponding polarity.

The created corona discharge may be classified into positive corona and negative corona according to the condition of the voltage applied to the electrodes for each polarity. Among them, the positive corona is easy to be spatially scalable compared to the negative corona, while the negative corona discharge process produces a large number of free electrons and radicals and thus is widely used in the field of industrial equipment.

Furthermore, a method for generating free electrons and anions is classified into a pulse power method, an alternating current power method and a direct current power method according to the type of a power supply used to provide power to each electrode. In this instance, the structure of the conventional ozone generator or negative oxygen ion generator using pulse power has a pin-plate structure including a discharge pin and a ground. The plus electrode assumes a plate shape, and the minus electrode assumes a pin shape, and when the pulse power is applied to each electrode, a corona discharge is created, and in this instance, ozone or negative oxygen ions are produced. However, the conventional power generator or wastewater treatment device has low process efficiency in the replacement of components due to multiple discharge pins and a complex structure of applying power to each of the multiple discharge pins.

SUMMARY

The present disclosure is designed to solve the above-described problem, and therefore the present disclosure is directed to providing a high-concentration wastewater treatment device for treating pollutants with strong oxidizing power using plasma with improved process efficiency by an improved coupling structure between a circuit module and a discharge pin module that make up the high-concentration wastewater treatment device for one-touch attachment/detachment design.

The present disclosure is further directed to providing a high-concentration wastewater treatment device with improved process efficiency by easy management of pollutants occurring during discharging through a discharge plate slidably coupled to a discharge plate module that constitutes the high-concentration wastewater treatment device and maintenance and repair improvement through a simple power application structure.

To achieve the above-described object, the high-concentration wastewater treatment device according to the present disclosure includes a discharge pin module 150 including a support plate 151, multiple discharge pins 155 coupled to the support plate, and pin connectors 152 connected to the multiple discharge pins 155 on the support plate 151 and extended upwards; a discharge plate module 160 spaced apart from the multiple discharge pins; and a circuit module 130 including a main board 131, multiple distributed processing boards 135 connected to the main board 131, coupling unit 138 which performs a function of connecting the multiple distributed processing boards 135, and discharge pin connection portions 136 electrically connected to the distributed processing boards 135 in a direction of a lower end of the main board 131, wherein the discharge plate module 160 includes a connection pin 161 connected to a lower end of the support plate 151 and a discharge plate accommodation portion 163 coupled to a lower end of the connection pin 161, and wherein the discharge pin connection portions 136 have, at lower ends, coupling grooves into which the pin connectors 152 are inserted, to allow one-touch coupling between the circuit module 130 and the discharge pin module 150.

The high-concentration wastewater treatment device further includes a discharge plate 170 slidably coupled to an inside of the discharge plate module 160.

The high-concentration wastewater treatment device further includes a support structure 140 positioned below the circuit module 130, wherein the support structure 140 includes a bottom plate 142, a sidewall 143 extended from the bottom plate, and a flange 144 extended outwards from above the sidewall, and provides an internal space accommodating the discharge pin module and the discharge plate module, and wherein when the flange is coupled to the sidewall through a flange protrusion 148, the discharge plate 170 slidably coupled to the discharge plate module 160 can be drawn through the flange through-hole.

The discharge plate 170 has multiple through-holes, each corresponding to each of the multiple discharge pins.

The pin connector 152 includes a lower connection plate 153 connected to the multiple discharge pins 155 on an upper surface of the support plate 151 and an upper connection plate 154 extended upwards from an end of the lower connection plate 153, and the upper connection plate 154 has a support connection plate 154a extended upwards from an end of the lower connection plate 153 and a coupling connection plate 154b having a smaller width than the support connection plate 154a and extended upwards.

The high-concentration wastewater treatment device according to the present disclosure as described above includes a discharge pin module 150 including a support plate 151, multiple discharge pins 155 coupled to the support plate, and an elastic connection element 158 electrically connecting a discharge pin group including at least two adjacent discharge pins among the multiple discharge pins and coupled to the support plate; a discharge plate module 160 positioned facing the multiple discharge pins; a support structure 140 including a coupling plate 145 disposed opposite the discharge plate module 160 with the support plate interposed therebetween, and to which the discharge pin module and the discharge plate module 160 are separably coupled; and a circuit module 130 including a main board 131 disposed opposite the discharge pin module with the coupling plate interposed therebetween, spaced apart from the coupling plate, and multiple distributed processing boards 135 connected to the main board to individually apply high voltage, high frequency pulse power to the discharge pin group, wherein the discharge plate module 160 is equipped with an electron generator including a connection pin 161 connected to a lower end of the coupling plate and a discharge plate accommodation portion 163 coupled to a lower end of the connection pin 161, thereby periodically managing dust collected on the discharge plate module 160 through the discharge plate 170, and allowing easy assembly and disassembly of the circuit module, the discharge pin module and the discharge plate, resulting in improved process efficiency.

DETAILED DESCRIPTION

Hereinafter, the embodiments of the present disclosure will be described in more detail with reference to the accompanying drawings. However, the present disclosure is not limited to the following disclosed embodiments and will be embodied in a variety of different forms, and these embodiments are provided so that this disclosure will be thorough and complete, and will fully convey the scope of the present disclosure to those skilled in the art. In the drawings, like reference signs denote like elements.

Figure 1:
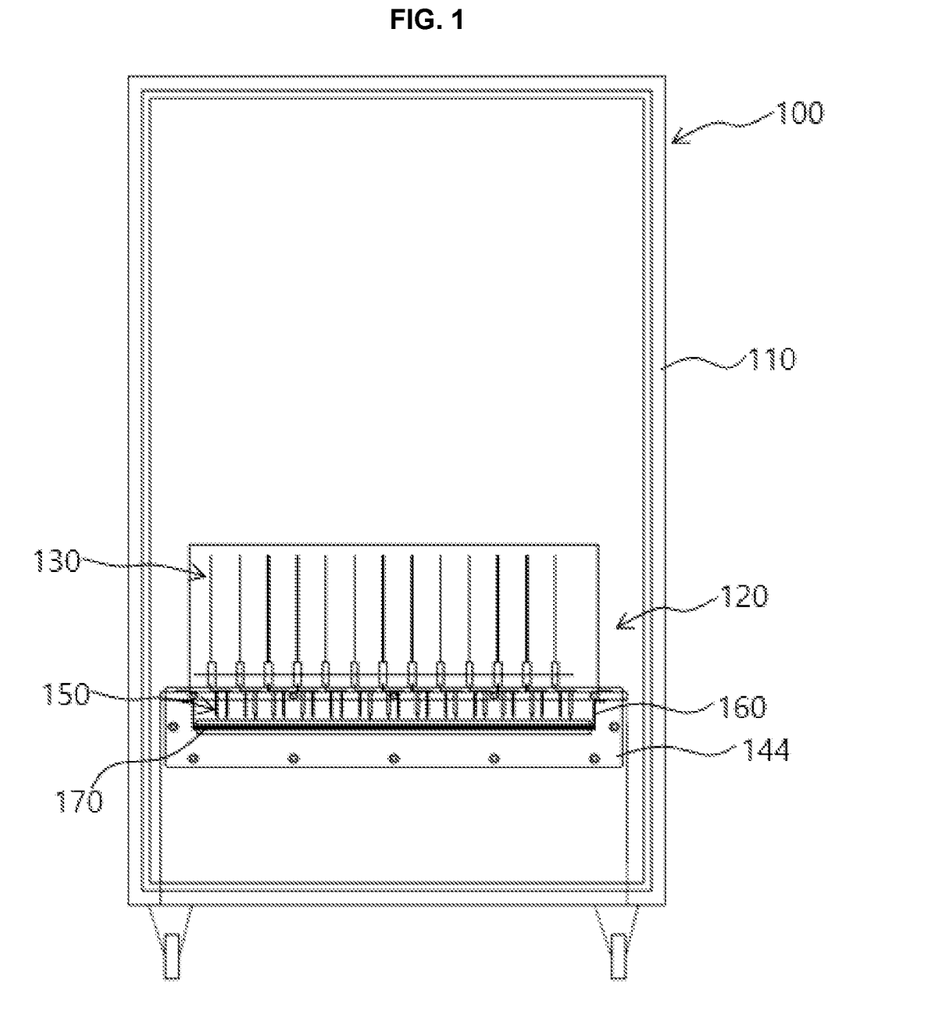
FIG. 1 is a front view of a high-concentration wastewater treatment device according to an embodiment of the present disclosure.
Figure 2:
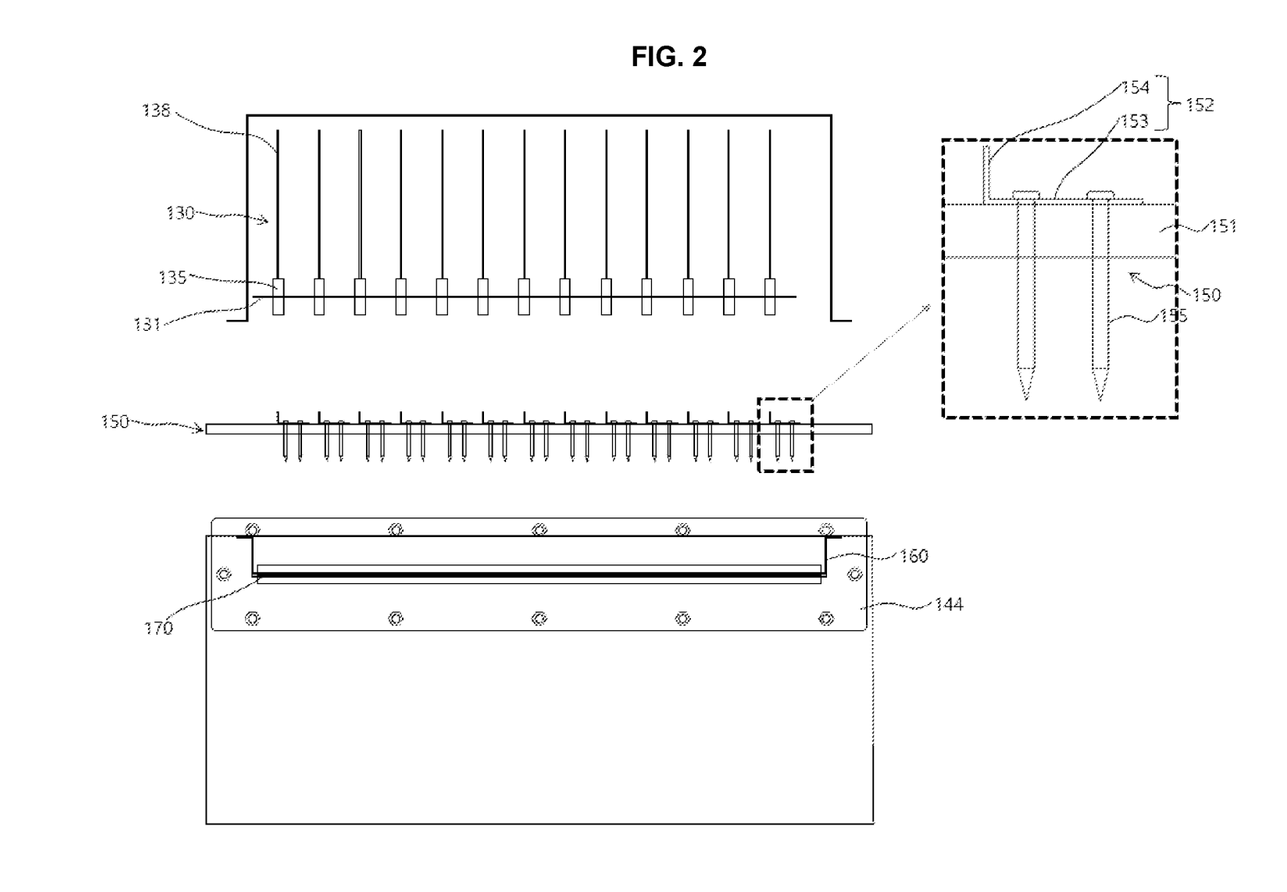
FIG. 2 is an exploded view of FIG. 1.
Figure 3:
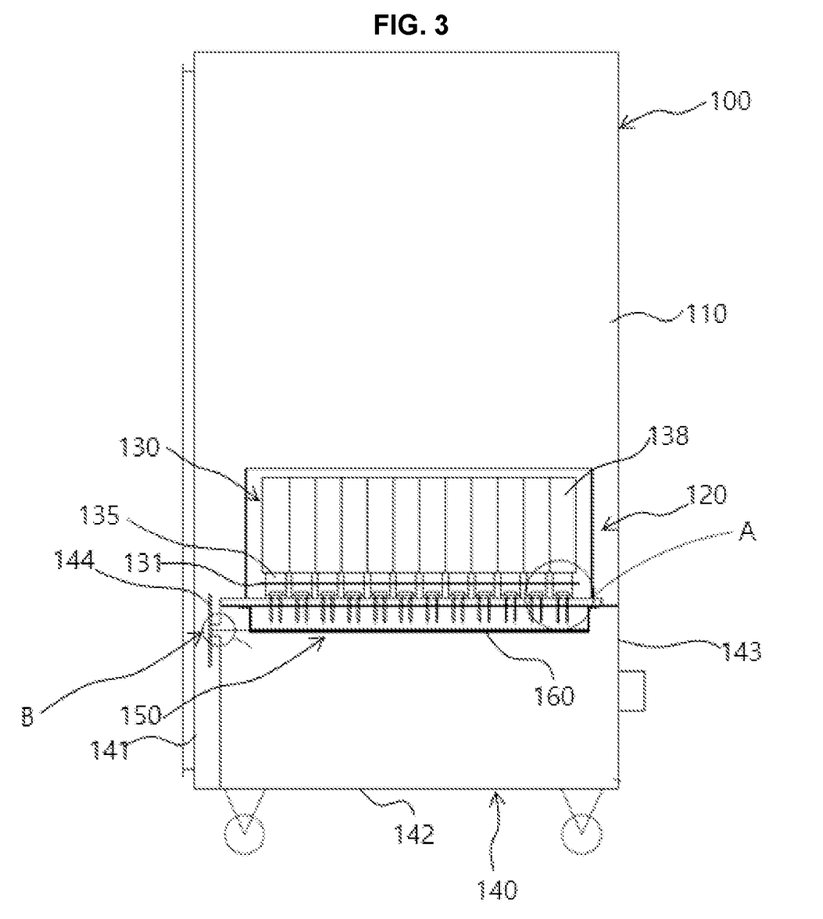
FIG. 3 is a side view of a high-concentration wastewater treatment device according to an embodiment of the present disclosure.
Figure 4:
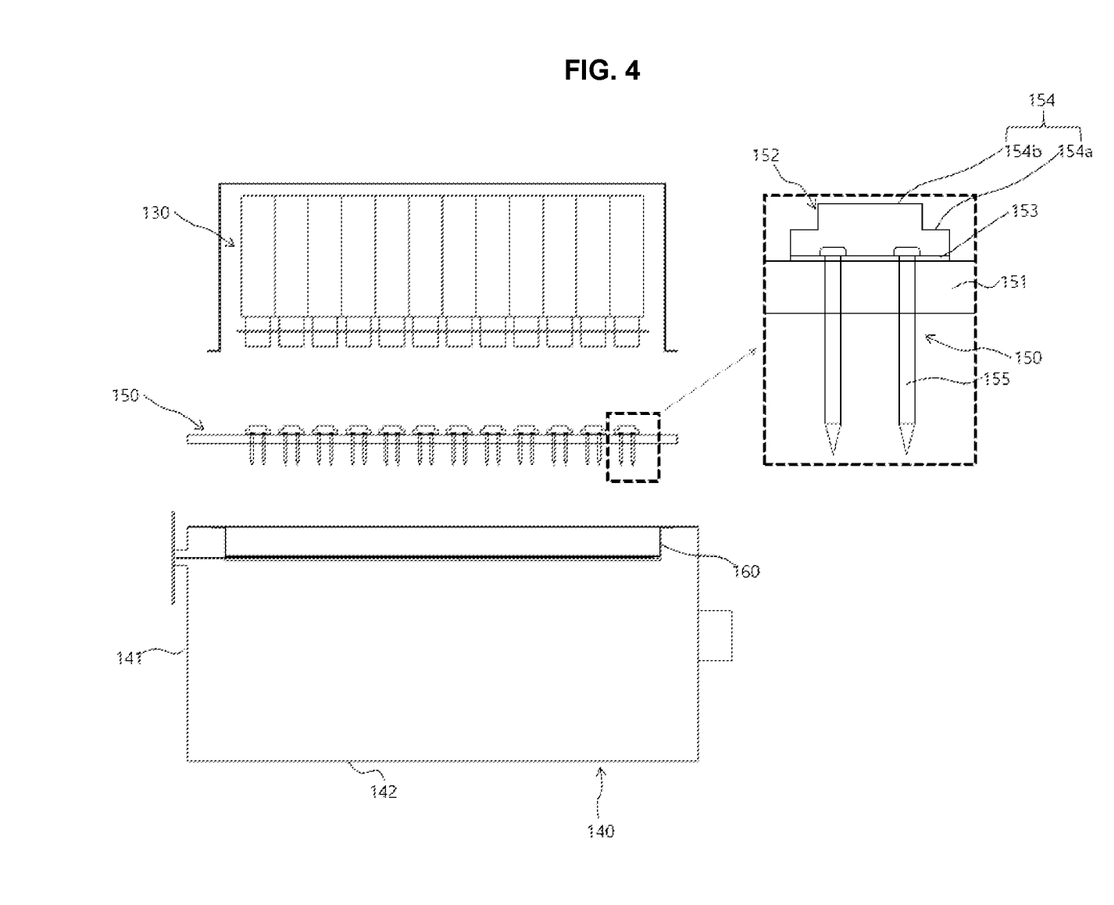
FIG. 4 is an exploded view of FIG. 3.
Figure 5:
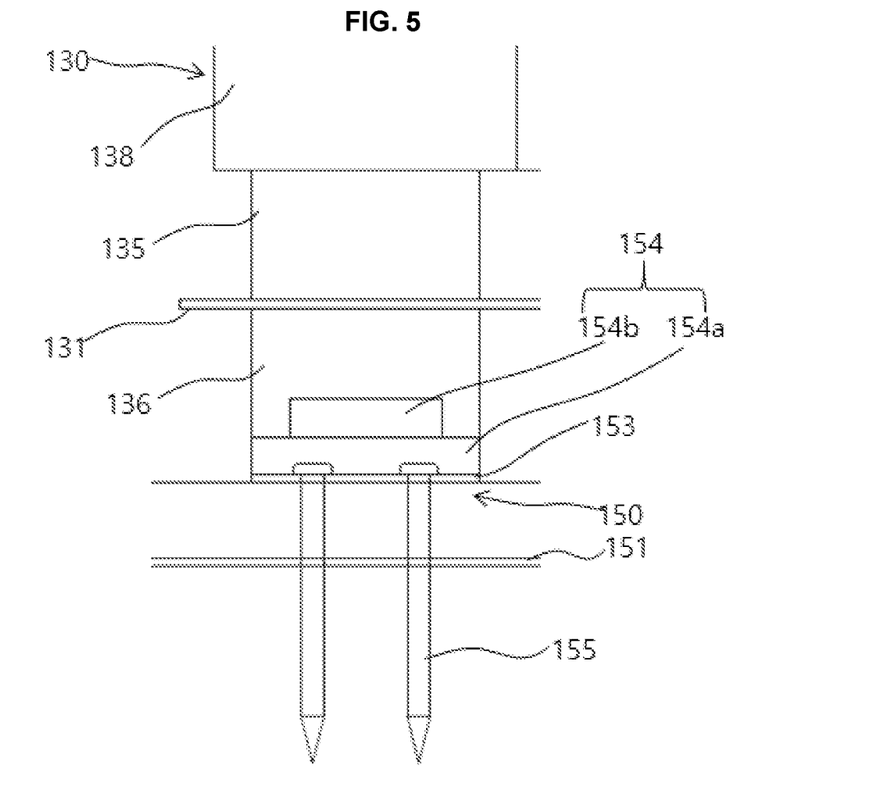
FIG. 5 is an enlarged view of section 'A' in FIG. 3.
Figure 6:
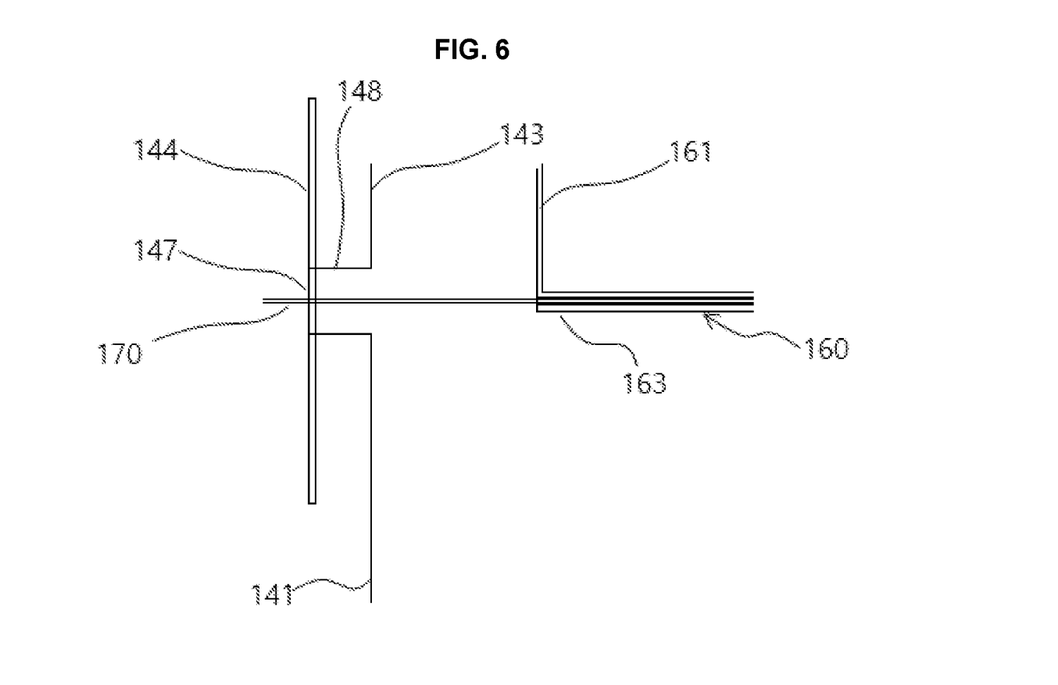
FIG. 6 is an enlarged view of section 'B' in FIG. 3.

A high-concentration wastewater treatment device according to the present disclosure will be described below with reference to FIGS. 1 to 6.

FIGS. 1 to 4 are front views and side views of the high-concentration wastewater treatment device according to an embodiment of the present disclosure, showing the inner parts.

The high-concentration wastewater treatment device 100 includes an external case 110 and an electron generation unit 120 received in the external case 110. Within the external case 110, a control unit to control the electron generation unit 120 and a power supply unit to supply power may be disposed on the electron generation unit 120 and received together.

The electron generation unit 120 includes a circuit module 130, a support structure 140 positioned below the circuit module 130, a discharge pin module 150 electrically connected to the circuit module 130, a discharge plate module 160 positioned spaced apart below the discharge pin module 150 and multiple electromagnetic field generators positioned and received in the support structure 140.

The circuit module 130 includes a main board 131, multiple distributed processing boards 135 connected to the main board 131, coupling unit 138 to perform a function of connecting the multiple distributed processing boards 135 and discharge pin connection portions 136 electrically connected to the distributed processing boards 135 in a direction of the lower end of the main board 131.

The discharge pin connection portions 136 perform a function of separably coupling to pin connectors 152 that constitute the discharge pin module 150. That is, the discharge pin connection portions 136 have, at the lower ends, coupling grooves into which the upper ends of the pin connectors 152 are inserted.

The main board 131 is generally flat plate-shaped, and includes multiple connection portions to which the multiple distributed processing boards 135 are connected. The multiple connection portions are spaced apart from each other on the main board 131 along the horizontal direction and the vertical direction. The distributed processing boards 135 are disposed on the upper surface of the main board 131.

Each of the multiple distributed processing boards 135 includes a stand-alone high voltage, high frequency pulse conversion circuit to individually apply high voltage, high frequency pulse power. The multiple distributed processing boards 135 are each connected to the connection portions provided in the main board 131 on the upper surface of the main board 131.

The main board 131 and the multiple distributed processing boards 135 connected to the main board 131 are kept in firmly coupled state by the coupling unit 138 to form the integrated circuit module 130.

The circuit module 130 is separably coupled to the discharge pin module 150 in a one-touch fashion.

The support structure 140 includes a bottom plate 142, a sidewall 143 extended from the bottom plate 142, and a flange 144 extended outwards from above the sidewall 143.

In the internal space of the support structure 140, the multiple electromagnetic field generators are installed and disposed at the bottom plate 142 and the sidewall 143. In the internal space of the support structure 140, electrons move downwards by the multiple electromagnetic field generators.

The discharge pin module 150 includes a support plate 151, multiple discharge pins 155 coupled to the support plate 151 and the pin connectors 152 coupled to the multiple discharge pins 155 on the support plate 151 and extended upwards.

The support plate 151 is generally flat plate-shaped and is made of an electrically insulating material. The multiple discharge pins 155 are coupled to the support plate 151.

The multiple discharge pins 155 pass through the support plate 151 in the downward direction from the top and protrude downwards from the support plate 151. The discharge pin 155 is made of an electrically conducting material, and in an embodiment, may be a screw coupled to the support plate 151. The head of the screw which is the discharge pin 155 is disposed on top of the support plate 151, and the elongated body protrudes to the opposite side of the support plate 151.

Among the multiple discharge pins 155, a plurality of adjacent discharge pins 155 forms a group of discharge pins electrically connected to each other. Although this embodiment describes a discharge pin group including four discharge pins 155, the present disclosure is not limited thereto. The four discharge pins 155 that form a discharge pin group are electrically connected to each other by an electrically conducting element (not shown). The electrically conducting element is configured to keep the four discharge pins 155 in connected state on top of the support plate 151.

High voltage is applied to a discharge pin group from its corresponding distributed processing board 135. The four discharge pins 155 that form a discharge pin group are electrically connected to each other.

The pin connector 152 has a lower connection plate 153 connected to the multiple discharge pins 155 on the upper surface of the support plate 151 and an upper connection plate 154 extended upwards from the end of the lower connection plate 153. The upper connection plate 154 has a support connection plate 154a extended upwards from the end of the lower connection plate 153 and a coupling connection plate 154b having a smaller width than the support connection plate 154a and extended upwards. The coupling connection plate 154b is coupled to the coupling groove formed at the lower end of the discharge pin connection portion 136.

The circuit module 130, the discharge pin module 150 and the discharge plate module 160 are separably coupled. When the discharge plate module 160 is positioned on the support structure 140, the discharge plate module 160 and the circuit module 130 are disposed in the internal space of the support structure 140.

The electricity by the distributed processing boards 135 of the circuit module 130 is applied to the discharge pin module 150 through a structure in which the discharge pin connection portions 136 electrically connected to the distributed processing boards 135 that constitute the circuit module 130 are separably coupled to the pin connectors 152 that constitute the discharge pin module 150.

The flange 144 is coupled in communication with the internal space of the support structure 140 in an area above the sidewall 143. That is, in the basic structure that forms a rectangular plate, a flange through-hole 147 having a predetermined width along the lengthwise direction is formed. A flange protrusion 148 is formed toward the discharge plate module 160 along the inner edge of the flange through-hole. That is, when the flange 144 is coupled to the sidewall 143 through the flange protrusion, a discharge plate 170 slidably coupled to the discharge plate module 160 can be drawn through the flange through-hole 147.

The present disclosure may periodically manage dust collected on the discharge plate module 160 through the discharge plate 170. That is, the conventional technology fails to perform the function of the discharge plate and needs to repair the entire device due to the buildup of impurity particles captured in the discharge plate module 160 area during discharging, but the present disclosure can draw the discharge plate 170 through one side of the bottom of the discharge plate module 160, making it easy to replace and clean.

The discharge plate module 160 is generally flat plate-shaped and is made of an electrically conducting material. The discharge plate module 160 is spaced a predetermined distance apart from the multiple discharge pins 155 in the internal space of the support structure 140.

The discharge plate module 160 has a connection pin 161 connected to the lower end of the support plate 151 and a discharge plate accommodation portion 163 coupled to the lower end of the connection pin 161. When the discharge plate accommodation portion 163 has a height corresponding to the flange protrusion 148 that constitutes the flange 144, one side of the discharge plate accommodation portion facing the flange protrusion is open and the other side of the discharge plate accommodation portion is in a closed state where it corresponds to an entry limiting point of the entering discharge plate.

When a corona discharge occurs between the discharge pin 155 and the discharge plate module 160, ionized electrons and radicals are discharged from the minus electrode or the discharge pin 155 to the plus electrode or the discharge plate module 160.

The discharge plate 170 has multiple through-holes at the shortest distance and the multiple through-holes correspond to the multiple discharge pins 155 in a one-to-one relationship. The through-holes maintain the shortest discharge distance when impurities such as dust discharged from the discharge pins 155 accumulate on the discharge plate 170 at the early stage of discharge, thereby improving the discharge efficiency.

The multiple electromagnetic field generators are installed at each of the bottom plate 142 and the sidewall 143 of the support structure 140 to move the electrons and radicals discharged from the discharge pins 155 toward the bottom plate 142. Each of the multiple electromagnetic field generators may include a core made of a galvanized steel sheet and a coil wound around the core, and any configuration capable of generating electromagnetic fields may be used.

The foregoing description is made to describe the technical spirit of the present disclosure for illustrative purposes, and it is obvious to those skilled in the art that a variety of modifications and change may be made thereto without departing from the essential features of the present disclosure. Therefore, the embodiments disclosed herein are provided to describe the technical spirit of the present disclosure and not intended to be limiting, and the technical spirit and scope of the present disclosure is not limited by the embodiments. The scope of protection of the present disclosure should be interpreted by the appended claims, and it should be interpreted that the scope of protection of the present disclosure covers all the technical spirit in the scope of the appended claims and equivalents thereof.

What is claimed is:

1. A high-concentration wastewater treatment device, comprising:
    a discharge pin module including a support plate, multiple discharge pins coupled to the support plate, and pin connectors connected to the multiple discharge pins on the support plate and extending upwards;
    a discharge plate module spaced apart from the multiple discharge pins; and
    a circuit module including a main board, multiple distributed processing boards connected to the main board, a coupling unit which performs a function of connecting the multiple distributed processing boards, and discharge pin connection portions electrically connected to the distributed processing boards in a direction of a lower end of the main board,
    wherein the discharge plate module includes a connection pin connected to a lower end of the support plate and a discharge plate accommodation portion coupled to a lower end of the connection pin; and
    the discharge pin connection portions have, at their lower ends, coupling grooves into which the pin connectors are inserted, to allow one-touch coupling between the circuit module and the discharge pin module.

2. The high-concentration wastewater treatment device according to claim 1, further comprising:
    a discharge plate slidably coupled to an inside of the discharge plate module.

3. The high-concentration wastewater treatment device according to claim 1, further comprising:
a support structure positioned below the circuit module, wherein the support structure includes a bottom plate, a sidewall extended from the bottom plate, and a flange extended outwards from above the sidewall, and provides an internal space accommodating the discharge pin module and the discharge plate module; and
when the flange is coupled to the sidewall through a flange protrusion, the discharge plate, which is slidably coupled to the discharge plate module, can be drawn through the flange through-hole.

4. The high-concentration wastewater treatment device according to claim 1, wherein the discharge plate has multiple through-holes, each corresponding to one of the multiple discharge pins.

5. The high-concentration wastewater treatment device according to claim 1, wherein the pin connector includes a lower connection plate connected to the multiple discharge pins on an upper surface of the support plate and an upper connection plate extending upwards from an end of the lower connection plate, and the upper connection plate has a support connection plate extending upwards from an end of the lower connection plate and a coupling connection plate having a smaller width than the support connection plate and extending upwards.

\* \* \* \* \*